United States Patent [19]

Matsumoto

[11] 4,024,549

[45] May 17, 1977

[54] AUTO-STROBE MEANS FOR CAMERAS

[75] Inventor: Kunio Matsumoto, Ageo, Japan

[73] Assignee: Copal Company Limited, Tokyo, Japan

[22] Filed: May 27, 1975

[21] Appl. No.: 580,755

[30] Foreign Application Priority Data

May 30, 1974 Japan .............................. 49-61110

[52] U.S. Cl. .................................. 354/33; 354/34; 354/127; 354/139; 354/145; 354/149

[51] Int. Cl.² .......................................... G03B 7/16

[58] Field of Search .................. 354/27, 32, 33, 34, 354/35, 127, 128, 139, 145, 149

[56] References Cited

UNITED STATES PATENTS

| | | |
|---|---|---|
| 3,682,056 | 8/1972 | Tokutomi .............................. 354/33 |
| 3,742,828 | 7/1973 | Nakajima et al. .................... 354/33 |
| 3,757,654 | 9/1973 | Mori ..................................... 354/33 |
| 3,805,278 | 4/1974 | Matsuzaki et al. ................... 354/33 |
| 3,840,882 | 10/1974 | Kawasaki ............................. 354/33 |

*Primary Examiner*—Russell E. Adams, Jr.
*Attorney, Agent, or Firm*—Cushman, Darby & Cushman

[57] ABSTRACT

An auto-strobe flash means for cameras which comprises a variable resistor inserted in a light measuring circuit of an electronic exposure time controlling arrangement for a shutter, the resistance value being a function of the photographing distance. A main flash discharge tube is ignited when the shutter is fully opened, and a differential amplifier is provided for controlling the shutter closing time in response to the value of the variable resistor.

3 Claims, 3 Drawing Figures

AUTO-STROBE MEANS FOR CAMERAS

BACKGROUND OF THE INVENTION a. Field of the invention

The present invention relates to strobe flash means for cameras and more particularly to improvements in an auto-strobe flash means wherein the amount of light produced by a flash discharge tube is made variable in response to the photographing distance.

b. Description of the Prior Art

An auto-strobe flash means of the type in which the amount of light produced is variable has been already suggested and a type in which the flashing time of a main flash discharge tube is controlled by a so-called by-pass discharge tube is also known. However, each of these known types is formed as a unit strobe flash means and having an independent electric circuit for obtaining the strobe flash means. Presently, however, many cameras have a built-in electric shutter. When conventional strobe flash means is used with such cameras, many strobe flash parts excess are included in the circuit elements forming the strobe flash means.

SUMMARY OF THE INVENTION

Therefore, a primary object of the present invention is to provide an auto-strobe flash means wherein a strobe flash controlling circuit is combined with an exposure time controlling circuit of a shutter so that the entire means may be simplified and either natural light photography or light flash photography may be carried out with proper exposure.

Another object of the present invention is to provide an auto-strobe flash means wherein the amount of light amount is automatically varied as a function of the photographing distance, that is, the distance from the camera to the object to be photographed, so that a photograph of proper exposure may be always taken irrespective of the photographing distance.

According to the present invention, these objects are attained by directing a photoelectric current which is a function of the brightness of the object to be photographed through a CR delay circuit for determining the exposure time, leading the voltages generated at the respective terminals of a capacitor and resistor which form the above mentioned delay circuit to differential amplifiers for controlling the closing time of the shutter and the energizing time of the flash discharge tube, and forming the above mentioned resistor as a variable resistor varying in resistance value as a function of the photographing distance.

DESCRIPTION OF THE PREFERRED EMBODIMENT

Figure 1:
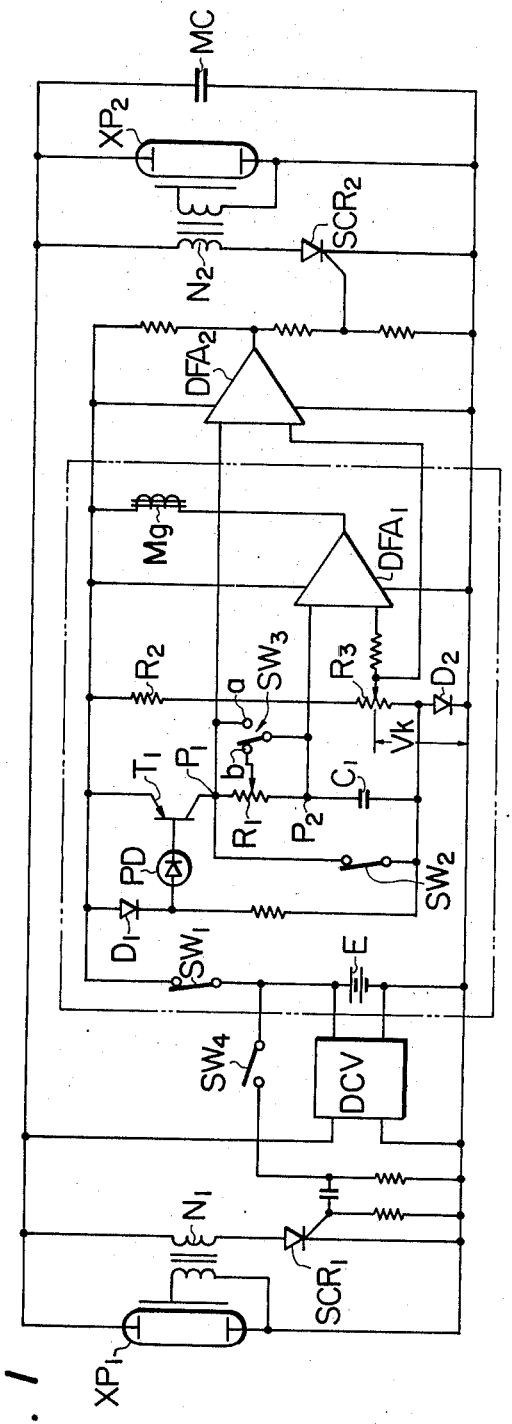
FIG. 1 is a circuit diagram showing an embodiment of the present invention.

In FIG. 1, the part enclosed within the dotted lines is an exposure time controlling circuit of an electric shutter and the remainder of the circuit is employed together with the above mentioned exposure time controlling circuit only when the strobe flash means is used.

Reference symbol PD signifies a photoelectromotive element such as a photodiode which provides fast response to variation of the amount of light symbol $T_1$ signifies a transistor having linearity in its current amplifying rate $h_{FE}$, symbols $R_1$ to $R_3$ signify resistors, being $R_1$ a variable resistor whose slider is operatively connected with a distance adjusting ring of a camera (not illustrated,) symbol $C_1$ signifies a capacitor, symbol $DFA_1$ signifies a differential amplifier for controlling the exposure, symbol $DFA_2$ signifies a differential amplifier operating as a detector symbol Mg signifies an electromagnet for controlling the closure of the shutter, symbol $D_1$ signifies a diode for establishing the voltage between the base and emitter of the transistor $T_1$, symbol $D_2$ signifies a diode for compensating for temperature, symbol $SW_1$ signifies a current source switch, symbol $SW_2$ signifies a starting switch operatively related to the shutter opening motion of the camera, symbol $SW_3$ signifies a switch for short-circuiting the resistor $R_1$ when it is switched to the contact $b$ from the contact $a$ as the strobe flash means is brought into use, and symbol E signifies a current source.

Additionally, in FIG. 1 symbol DCV signifies a DC-DC converter, symbols $SCR_1$ and $SCR_2$ signify silicon-controlled rectifiers, symbol $XP_1$ signifies a main flash discharge tube, symbol $XP_2$ signifies an additional discharge tube, symbol MC signifies a main capacitor for maintaining the voltage boosted by the convertor DCV, and symbol $SW_4$ signifies a synchro-switch which is closed when the shutter is fully opened.

The operation of the above described circuit now will be explained with ordinary photographing without the use of the flash light first being described. In this case, the switch $SW_3$ is connected to contact a and the resistor $R_1$ is short-circuited. When the current source switch $SW_1$ is closed as illustrated and the shutter is opened by the shutter release, the switch $SW_2$ is opened by the opening motion and the circuit is conditioned to measure light. When the light from the object to be photographed falls on the photodiode PD, the capacitor $C_1$ is directly charged with the constant current flowing between the emitter and collector of the transistor $T_1$ being proportional to the amount of incident light. Now, if one terminal of the differential amplifier $DFA_1$ is at a voltage $V_K$ established by the resistors $R_2$ and $R_3$, when the potential caused by the charging of the above mentioned capacitor $C_1$ reaches $V_K$, the differential amplifier $DFA_1$ will operate and the electromagnet Mg controlling the closing motion of the shutter will function so that the shutter is closed to completed one exposing operation.

In, the case of flash photography, with the switch $SW_3$ switched to contact $b$ , the switch $SW_2$ is opened by the shutter release and the switch $SW_4$ closes at the time when the shutter is fully opened silicon-controlled resistor the whereby $SCR_1$ will operate, and a current will flow through the primary coil $N_1$. As, a result, the discharge tube $XP_1$ will be ignited causing a flash. When this flash is recieved by the photodiode PD, due to the constant current circuit which includes the transistor $T_1$, a current proportional to the intensity of the light of the flash will flow through the resistor $R_1$ (which has its resistance value predetermined as it is operatively connected with the camera's adjusting ring) and the capacitor $C_1$ will charge. Therefore, when the voltage at the point $P_1$ (that is, the collector voltage of the transistor $T_1$ reaches the preset voltage $V_K$, the differential amplifier $DFA_2$ operates whereby $SCR_2$ conducts to cause the current silicon-controlled rectifier to flow through the primary coil $N_2$. As a result the discharge tube $XP_2$ is ignited after the comma), the charge remaining in the main capacitor MC is discharged whereby and the flash of the discharge tube $XP_1$ is estinguished. Subsequently, when the voltage at the point $P_2$ becomes $V_K$, the differential amplifier $DFA$, operates, causing the electromagnet Mg to be de-energized and the shutter to be closed.

The foregoing the explanation has been made without particularly considering the resistance value of the variable resistor $R_1$. However, if the resistance value of this resistor $R_1$ is varied, the time for the potential of the point $P_1$ to reach $V_K$ can be varied and therefore, with the slider of this variable resistor $R_1$ being operatively connected with the distance adjusting ring of the camera as previously described the time for operating the discharge tube $XP_2$ (and thus the ignition time of the main flash discharge tube $XP_1$) is a function of the distance from the object to be photographed and the light amount of light projected on the object to be photographed is controlled as a result.

Figure 3:
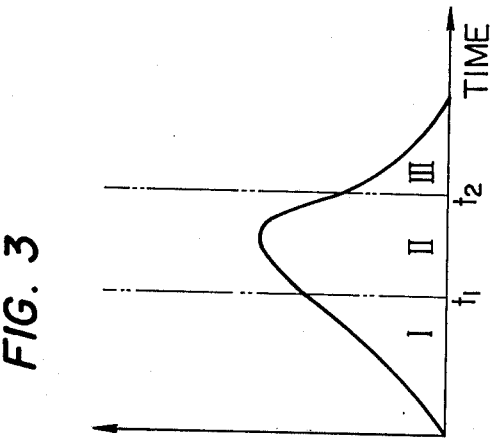
FIG. 3 is a diagram showing flashing characteristics of a main flash discharge tube.
Figure 2:
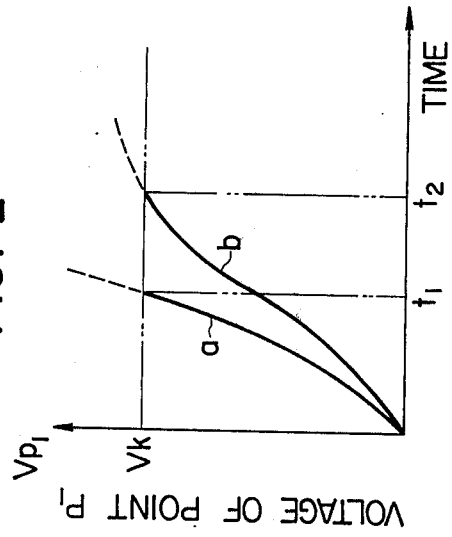
FIG. 2 is a diagram showing rising characteristics of the voltage at a point $P_1$ in the circuit shown in FIG. 1.

As shown by symbol $a$ in FIG. 2, when the distance from the camera to the object to be photographed in short, the potential of the point $P_1$ will reach the voltage $V_K$ when the time $t_1$ has elapsed, and therefore, the light emitted by the flash will die after the lapse of the time $t_1$ as shown in FIG. 3, the amount of flash being equal to the area of the range I. If the distance to the object to be photographed is long and the potential of the point $P_1$ reaches the voltage $V_K$ when the time $t_2$ has elapsed, the flash will last until the time $t_2$ elapses and the amount of light projected on the object to be photographed in this case will be equivalent to the areas of the ranges I and II.

I claim:

1. An auto-strobe flash means for a camera comprising a main flash discharge tube, means responsive to the opening of a shutter of said camera for energizing the flash discharge tube, a photoelectric element for receiving light from said flash discharge tube reflected by an object to be photographed and generating a photoelectric current in response to said light, a transistor connected to said photoelectric element to conduct a constant current proportional to the amount of the photoelectric current generated in said photoelectric element, a variable resistor connected to said transistor, a capacitor connected to said variable resistor, a first differential amplifier having one input terminal connected to the connecting point of said transistor and said variable resistor and another input terminal connected to said variable resistor, said first differential amplifier having its output electrically interconnected to said flash discharge tube energizing means for controlling the termination of energization of said discharge tube, means for controlling the closing of said shutter, and a second differential amplifier having one input terminal connected to the connecting point of said variable resistor and said capacitor and another input terminal connected to said variable resistor, said second differential amplifier having its output electrically interconnected to said shutter closing controlling means, said first and second differential amplifiers being respectively operative to produce outputs in accordance with a bias voltage established by said variable resistor.

2. An auto-strobe flash means for cameras according to claim 1 wherein the resistance value of said variable resistor is determined in response to the photographing distance.

3. An auto-strobe flash means for cameras according to claim 1 wherein said auto-strobe flash means further comprises a change over switch capable of connecting said one input terminal of each of said first and second differential amplifiers directly to said transistor.

* * * * *